United States Patent
Mourier et al.

(10) Patent No.: US 12,203,175 B2
(45) Date of Patent: Jan. 21, 2025

(54) METHOD FOR PREVENTING THE FORMATION OF WHITE RUST ON A ZINC-COATED STEEL SURFACE

(71) Applicant: SUEZ GROUPE, Paris la Défense (FR)

(72) Inventors: Stéphanie Mourier, La Frette sur Seine (FR); Eric Toledo, Achères (FR)

(73) Assignee: SUEZ GROUPE, Paris la Défense (FR)

(*) Notice: Subject to any disclaimer, the term of this patent is extended or adjusted under 35 U.S.C. 154(b) by 1111 days.

(21) Appl. No.: 17/040,032

(22) PCT Filed: Mar. 29, 2019

(86) PCT No.: PCT/EP2019/058073
§ 371 (c)(1),
(2) Date: Sep. 21, 2020

(87) PCT Pub. No.: WO2019/185906
PCT Pub. Date: Oct. 3, 2019

(65) Prior Publication Data
US 2021/0017652 A1    Jan. 21, 2021

(30) Foreign Application Priority Data

Mar. 29, 2018 (FR) ...................... 1800261

(51) Int. Cl.
*C23F 11/16* (2006.01)
*C23C 22/68* (2006.01)
(Continued)

(52) U.S. Cl.
CPC ............ *C23F 11/163* (2013.01); *C23C 22/68* (2013.01); *C23F 11/10* (2013.01); *C23F 11/167* (2013.01); *C23F 11/184* (2013.01); *C23F 14/02* (2013.01)

(58) Field of Classification Search
CPC .......... C23F 11/163; C23F 11/10; C23F 4/02; C23C 22/68
See application file for complete search history.

(56) References Cited

U.S. PATENT DOCUMENTS 4,105,406 A * 8/1978 Murray ................. C23F 11/184
                                                          252/387
4,592,783 A * 6/1986 Dressler ............... C10M 159/24
                                                          106/14.05
(Continued)

FOREIGN PATENT DOCUMENTS

CN    101736337 A    6/2010
CN    103215110 A *  7/2013
(Continued)

OTHER PUBLICATIONS

Machine Translation of "Zhang et al.", CN 101736337, cited in IDS filed Sep. 21, 2020 (Year: 2010).*

(Continued)

*Primary Examiner* — Jennifer Wecker
*Assistant Examiner* — Brady C Pilsbury
(74) *Attorney, Agent, or Firm* — BakerHostetler

(57) ABSTRACT

A process for preventing the formation of white rust on a steel surface at least partially coated with zinc includes a) bringing said surface, preferably under thermal load, into contact with an aqueous composition, the pH of which is between 6.5 and 8.5 comprising at least one organic acid of formula:

$$R-X-OH \qquad (I)$$

wherein X represents C(O) or S(O)2, and R represents an organic chain. A composition and also to a cooling tower treated by the process are provided.

13 Claims, 2 Drawing Sheets

(51) Int. Cl.
  *C23F 11/10*   (2006.01)
  *C23F 11/167*  (2006.01)
  *C23F 11/18*   (2006.01)
  *C23F 14/02*   (2006.01)

(56) References Cited

U.S. PATENT DOCUMENTS

| | | | | |
|---|---|---|---|---|
| 4,847,001 | A | * | 7/1989 | Cuisia .................... C23F 11/163 422/16 |
| 5,866,042 | A | | 2/1999 | Chen et al. |
| 6,468,470 | B1 | | 10/2002 | Oldsberg et al. |
| 2007/0164258 | A1 | | 7/2007 | Emerson et al. |
| 2011/0214690 | A1 | * | 9/2011 | Laffitte .................... C23G 1/088 510/276 |
| 2012/0010111 | A1 | * | 1/2012 | Shibata ................ C10M 133/16 508/463 |
| 2012/0260938 | A1 | * | 10/2012 | Zack ....................... C11D 7/265 510/480 |
| 2013/0112107 | A1 | * | 5/2013 | Marenco ............... C23F 11/163 106/14.41 |
| 2015/0376799 | A1 | * | 12/2015 | Felipe .................... C23F 11/126 210/698 |
| 2016/0017200 | A1 | | 1/2016 | Yang et al. |
| 2017/0297938 | A1 | | 10/2017 | Drewniak et al. |
| 2019/0085439 | A1 | * | 3/2019 | Neufeld .................... C23C 2/26 |
| 2019/0301027 | A1 | * | 10/2019 | Urch ..................... C23F 11/181 |

FOREIGN PATENT DOCUMENTS

| | | |
|---|---|---|
| JP | 3701475 B2 * | 9/2005 |
| WO | 2016/003483 A1 | 1/2016 |
| WO | 2017/180328 A1 | 10/2017 |

OTHER PUBLICATIONS

Fondriest Environmental, Inc. "Conductivity, Salinity and Total Dissolved Solids." Fundamentals of Environmental Measurements. Mar. 3, 2014. Web. (Year: 2014).*
YSI, "Water Hardness: Can You Determine Water Hardness From Conductivity or Total Dissolved Solids Measurements", 2023 {relied on only for unit conversions} (Year: 2023).*
Translation of the Written Opinon of the Interenational Searching Authority for International Applicatoin PCT/EP2019/058073 (Year: 2019).*
J. Kosch, "Cooling Tower Passivation", Midwest Water Treatment, available May 25, 2005, https://www.midwestwt.com/cooling-tower-passivation (Year: 2005).*
Emerson Process Management, "Basics of pH Control", Mar. 2011 (Year: 2011).*
Baltimore Aircoil Company, "White Rust", Sep. 2010, (Year: 2010).*
"White Rust Prevention: An Industry Update and Guide Paper", Presented by Association of Water Technologies (AWT), 2012 (Year: 2012).*

* cited by examiner

METHOD FOR PREVENTING THE FORMATION OF WHITE RUST ON A ZINC-COATED STEEL SURFACE

CROSS-REFERENCE TO RELATED APPLICATIONS

This application is a National Stage of International patent application PCT/EP2019/058073, filed on Mar. 29, 2019, which claims priority to foreign French patent application No. FR 1800261, filed on Mar. 29, 2018, the disclosures of which are incorporated by reference in their entirety.

FIELD OF THE INVENTION

The invention relates to a process for preventing the formation of white rust on a zinc-coated steel (galvanized steel) surface, said surface being notably used as heat exchanger in a cooling tower. The invention also relates to a cooling tower with a zinc-coated steel surface treated by such a process.

BACKGROUND

A cooling tower is a device used to cool a liquid, which is generally water, by heat exchange via contact—typically via direct contact—with the ambient air. The function of such a tower is to discharge the heat derived from systems such as a refrigeration unit or an industrial process to the surroundings.

There are essentially two types of tower. The first category of cooling tower is referred to as the "closed primary circuit" or "closed tower" type, as represented in FIG. 1. The second category is referred to as the "open primary circuit" or "open tower" type. For these two types of tower, the heat is discharged by evaporation of a portion of the water. In the case of a tower referred to as a "closed tower 1" (FIG. 1), the hot fluid to be cooled 10 flows in a tube bundle 11, cooled by water spraying 12. One advantage of a closed tower is that of limiting pollution due to the process to which the tower is connected. In the case of a tower referred to as an "open tower 2" (FIG. 2), the hot water to be cooled 10 is sprayed in the upper part of the tower, and flows into a zone 13 where the water/air contact surface is maximized in order to increase the heat transfer. The towers also comprise walls (14) and a basin (15).

Cooling towers generally comprise components made of glavanized steel. These are in particular heat exchange zones such as tube bundles (closed tower) or the basin.

As indicated above, galvanized steel is steel coated with a layer of zinc which protects the steel from corrosion notably in three ways: 1) by the formation of a physical shield between the steel and the surroundings, 2) by slowing down corrosion phenomena (the oxidation kinetics of zinc are much slower than those of steel), and 3) by playing a sacrificial role in the event of a discontinuity (scratch for example) of the zinc layer (battery effect between the steel and the zinc owing to the lower dissolution potential of zinc compared to that of iron). However, the protection offered by the galvanizing layer is only fully effective once the zinc is coated with a passivation layer.

Thus, the galvanized steel components of cooling towers, notably the heat exchangers such as the tube bundles (closed towers) or the basin (open towers) are vulnerable to corrosion in the presence of water during the initial commissioning of said towers. Specifically, the zinc layer, which is not yet passivated, may then be subjected to corrosion, leading to a reduction in the service life of the tower. This corrosion is generally fast and localized, and is revealed by the formation of white or gray crystals of zinc hydroxide, oxides and/or carbonates, generally grouped together under the generic name "white rust" or "white corrosion".

White rust generally appears on a new tower during the commissioning thereof, and is accelerated when subjected to a thermal load. In other words, the first weeks of exposure of the glavanized steel to water are crucial and must be carefully monitored in order to avoid and/or prevent the formation of white rust.

As indicated above, the zinc is itself stabilized by the formation of an amorphous and unchanging passivation layer which forms at its surface, composed in particular of zinc hydroxide, oxides and/or carbonates and/or of mixed species. The process for formation of such a passivation layer is complex and requires precise monitoring of certain physico-chemical parameters, in particular the pH.

One solution for forming the passivation layer is so-called natural passivation. It consists in circulating water without thermal load in the equipment while respecting certain physico-chemical parameters. The duration of the process, around two months, is not however compatible with the operating constraints: manufacturers are, most of the time, forced to start up their cooling towers immediately under thermal load.

However, the pH of the water contained in a cooling tower is not constant when the tower is in operation owing to the release of $CO_2$ (in other words, owing to the $CO_2$ "stripping" phenomenon).

It will be noted that it is known from the prior art that strong mineral acids, such as sulfuric, nitric or hydrochloric acid, have a tendency to promote corrosion rather than passivation. The prior art nevertheless describes several methods of passivation of galvanized steel for cooling towers, comprising the addition of acid to the water to be cooled.

Processes are also known that comprise the addition of chromate-based corrosion inhibitors, as described in particular in U.S. Pat. No. 3,352,793. However, owing to their toxicity, chromates are no longer used today.

The solution from the prior art generally implemented today is the use of organophosphorus compounds, as described for example in U.S. Pat. No. 6,468,470 or WO2017/180328. In practice, the effectiveness of this type of process is called into question since the passivation obtained still remains insufficient and the rates of corrosion excessive.

Furthermore, patent application WO 2016/003483 discloses a method for treating aqueous systems, intended notably to limit the corrosion of said systems, comprising the use of hydroxycarboxylic acids or salts thereof, as alternatives to the use of phosphorus derivatives. According to one variant, the aqueous compositions used may comprise para-toluenesulfonic (p-TSA) acid, but this is used as a "chemical tag", more specifically as a fluorophore (see D1, page 7, paragraphs [0029]-[0030]), and not as an anti-corrosion agent, specifically aiming to avoid the formation of white rust.

U.S. Pat. No. 5,866,042 discloses methods and compositions for inhibiting the corrosion of iron-based metals in contact with aqueous systems, using a copolymer of (meth)

acrylic acid and 2-acetoacetoxyethyl methacrylate, which does not fall under the definition of formula (I) of the present invention.

Patent application CN101736337 discloses a method that aims to passivate galvanized steel without resorting to chromates. However, the method of CN101736337 is an "electroplating" type treatment. This process is therefore fundamentally different from the methods and uses of the present invention, since it is a question of treating the steel before manufacture of the metal devices intended to contain water, and not during the commissioning thereof. In any case, the sole composition comprising sulfonic acid is described in example 13, and it is noted that the pH of the passivation bath is adjusted to a value of 6.

Lastly, patent application US 2016/0017200 discloses heat transfer fluids comprising carboxylates. It does not disclose compositions or methods for preventing and/or stopping the appearance of white rust on a steel surface at least partially coated with zinc.

There is therefore a need for processes that make it possible to prevent and/or combat the degradation of the zinc layer during the first weeks of operation of the cooling tower, in particular under thermal load, which are easy to use industrially, economically viable, relatively fast, not harmful to the environment, and which do not promote the proliferation of bacteria.

SUMMARY OF THE INVENTION

The invention aims to overcome all or some of the abovementioned problems by proposing a solution for combatting the degradation of the zinc layer during the first weeks of operation of the cooling tower. The solution consists of the implementation of a water conditioning able to prevent and/or inhibit the corrosion of the zinc and able to form a protective layer, referred to as a passivation layer, on the zinc-coated surface of the cooling tower, and this in particular during the normal operation thereof, notably under thermal load.

Within the meaning of the present invention, a "galvanized steel surface" is understood to mean a steel surface coated, at least partially, with a thin layer of zinc, generally applied by an electrochemical process. According to one embodiment, the steel is completely coated with a thin layer of zinc. The thickness of the zinc layer varies depending on the targeted uses. It is generally between 5 and 500 μm, notably between 50 and 300 μm. In general, it is 80 μm.

The galvanized steel surface is typically located in the heat exchange zones (top part of the tower). These are notably heat exchangers such as tube bundles (closed towers). The cooling towers may comprise other parts with galvanized steel surfaces, such as the walls and/or the basin (bottom part of the tower).

Within the meaning of the present invention, a "thermal load" signifies that a hot fluid is circulated in the tower and gives rise to a temperature differential in the heat exchange zone, notably in the heat exchangers such as the tube bundles (closed tower), and brings about the evaporation of water. Thus, there is a temperature differential between the water sprayed in the top part of the tower (hot part) and the water contained in the basin (cold part). This temperature differential is generally between 5° C. and 20° C., notably 8° C. and 15° C., typically it is 10° C.

For this purpose, the subject of the invention is a process for preventing and/or stopping the formation of white rust on a steel surface at least partially coated with zinc, comprising a) bringing said surface into contact with an aqueous composition, the pH of which is between 6.5 and 8.5 comprising at least one organic acid of formula (I):

wherein X represents C(O) or S(O)$_2$, preferably X represents S(O)$_2$, and R represents an organic chain, notably:
  a linear or branched C$_1$-C$_{12}$ alkyl, optionally substituted with one or more (notably 1 to 3) groups chosen from a halogen, OH, COOH or an aryl or heteroaryl group, said aryl or heteroaryl group being itself optionally substituted with a halogen, OH, a linear or branched C$_1$-C$_4$ alkyl or a COOH group; or
  an aryl or heteroaryl group, optionally substituted with a halogen, OH, linear or branched C$_1$-C$_4$ alkyl or COOH group;
it being understood that, when X represents CO, the C$_1$-C$_{12}$ alkyl comprises no more than 2 COOH groups and preferably the C$_1$-C$_{12}$ alkyl comprises no more than one COOH substituent.

This process has the effect of bringing the galvanized steel surface into contact with water at a pH between 6.5 and 8.5 in order to form the protective layer, referred to as the passivation layer, on the surface of the zinc.

Within the meaning of the present invention, a "C$_1$-C$_{12}$ alkyl" is understood to mean a linear or branched, saturated monovalent hydrocarbon chain comprising 1 to 12, preferably 1 to 6, notably 1 to 4 carbon atoms. By way of example, mention may be made of methyl, ethyl, propyl, isopropyl, butyl, isobutyl, sec-butyl, tert-butyl, pentyl or else hexyl. Preferably, it is methyl and ethyl groups.

The term "aryl" is understood to mean, within the meaning of the present invention, a monocyclic or bicyclic aromatic hydrocarbon group, preferably comprising from 6 to 10 carbon atoms, and comprising one or more fused rings, such as for example a phenyl or naphthyl group. Advantageously, it is a phenyl.

The term "heteroaryl" is understood to mean, within the meaning of the present invention, a monocyclic or bicyclic aromatic group comprising 5 to 10 ring atoms, including one or more heteroatoms, advantageously 1 to 4 and more advantageously still 1 or 2, chosen from sulfur, nitrogen and oxygen atoms, the other ring atoms being carbon atoms. Examples of heteroaryl groups are furyl, thienyl, pyrrolyl, pyridinyl, pyrimidinyl, pyrazolyl, imidazolyl, triazolyl, tetrazolyl, indyl, quinoline or isoquinoline groups.

The term "halogen group" is understood to mean, within the meaning of the present invention, fluorine, chlorine, bromine and iodine atoms, preferably the fluorine atom.

Typically, in the process of the invention, the steel surface at least partially coated with zinc is subjected to a thermal load (or temperature rise), notably during step a). This temperature rise results from bringing said surface into contact with a hot fluid or fluid to be cooled, said hot fluid generally being at a temperature between 40° C. and 100° C., notably between 50° C. and 90° C.

Typically, in a closed tower, the hot fluid is a refrigerant fluid such as ammonia, which is generally at a temperature of around 80° C., notably between 75° C. and 85° C. In an open tower, the hot fluid is typically industrial water at a temperature generally between 35° C. and 50° C.

Under thermal load the composition has a temperature between 15° C. and 40° C., notably between 25° C. and 35° C., depending on the season and on the measurement point in the tower, the water being hotter in the top part of the tower, in particular in the heat exchanger, than in the bottom part of the tower, and in particular in the basin.

Advantageously, R represents a linear or branched, preferably linear, $C_1$-$C_6$ alkyl, optionally substituted with one or more groups (in particular from 1 to 3 groups) chosen from a halogen OH, COOH, or an aryl group, said aryl group being itself optionally substituted with a halogen, OH or COOH group, it being understood that the $C_1$-$C_{12}$ alkyl comprises no more than 2 COOH groups when X represents CO. Preferably, R represents a linear or branched, preferably linear, $C_1$-$C_6$ alkyl, optionally substituted with one or two groups chosen from a halogen, OH, COOH, or a phenyl group, said phenyl group itself being optionally substituted with a halogen, OH or COOH group.

Preferably, R represents a linear or branched, preferably linear, $C_1$-$C_6$ alkyl, optionally substituted with one or two groups chosen from a fluorine atom, OH or COOH. Most preferably, R represents an unsubstituted linear or branched $C_1$-$C_6$ alkyl, and in particular R is $CH_3$.

According to a first embodiment, X represents $SO_2$. This embodiment is advantageous since sulfonic acids have a lower pKa than the corresponding carboxylic acids, which makes it possible, in order to obtain an identical pH of the composition, to add a lower amount of acid. In this embodiment, R may represent a tolyl group (the acid of formula (I) is then advantageously para-toluenesulfonic acid), a methyl or a trifluoromethyl. Advantageously, in this embodiment, R is $CH_3$, i.e. the acid of formula (I) is methanesulfonic acid. The methanesulfonic acid is particularly advantageous since it dissociates almost completely in water. This results in an ease of control of the pH by moderate additions of this acid.

According to another embodiment of the invention, X represents CO. In this embodiment, the acid of formula (I) is a carboxylic acid, such as acetic acid. It will be noted that citric acid is excluded from the field of the invention, since although it is effective for promoting the passivation layer and therefore for making it possible to prevent the formation of white rust, it has been shown that citric acid promotes bacterial proliferation.

Within the meaning of the present invention, an "aqueous composition" is predominantly composed or essentially constituted of water, and may contain one or more additives. In particular, the aqueous composition comprises at least 95% by weight of water, in particular at least 99% by weight of water relative to the total weight of the composition.

The aqueous composition of the invention may in particular be water for industrial use, the pH of which is adjusted to a value between 6.5 and 8.5 by addition of organic acid of formula (I) as defined above or below, and to which one or more additives are optionally added. It may be industrial water, but also municipal water (optionally softened and/or pretreated), drilling water and/or surface water (in particular lake water, rain water).

According to one particular embodiment, the aqueous composition of the invention is free of chromates.

According to one particular embodiment, the aqueous composition of the invention is free of tannins. A "tannin" is understood to be a polyphenolic compound comprising several phenolic groups (i.e. phenyl groups substituted with at least one OH group). One example of tannin is tannic acid (CAS number 1401-55-4 or 18483-17-5).

According to one particular embodiment, the aqueous composition of the invention is free of surfactant, in particular the aqueous composition is free of amphoteric surfactant.

According to one particular embodiment, the aqueous composition of the invention further comprises a scale inhibitor and/or a corrosion inhibitor and/or a biocide.

The scale inhibitor makes it possible to prevent or limit the formation of scale. It acts by dispersion or crystalline distortion. It is for example an acrylic polymer, which acts by dispersion or a phosphonate, which acts by crystalline distortion.

The corrosion inhibitor is in particular intended to prevent and/or limit the corrosion of the metal parts of the cooling tower which do not comprise a zinc layer. It makes it possible to act additionally in a preventative manner against corrosion. The corrosion inhibitor is preferably a phosphorus corrosion inhibitor such as an orthophosphate.

The biocide agent makes it possible to prevent or limit the proliferation of bacteria. It is chosen from oxidizing biocide agents, such as sodium hypochlorite and chlorine dioxide, and non-oxidizing biocide agents such as isothiazolinones.

The process according to the invention may also comprise just one, or several in combination, of the following steps:
addition to the aqueous composition of a corrosion inhibitor,
addition to the aqueous composition of a scale inhibitor,
addition to the aqueous composition of a biocide.

The corrosion inhibitor, scale inhibitor and biocide are advantageously as defined above.

In one advantageous embodiment, the composition further comprises a phosphorus compound. The phosphorus compound may also have other properties, such as anticorrosion properties or scale-inhibiting properties or phosphating agent properties, and be already known for the conditioning of cooling towers. Such phosphorus compounds, in combination with the acid of formula (I), makes it possible to obtain a synergistic effect. Without wishing to be bound by theory, it appears that such phosphorus compounds make it possible to improve and/or accelerate the formation of the passivation layer.

Preferably, said phosphorus compound is a phosphating agent. For example, it may be a hexametaphosphate, in particular sold by SUEZ under the name AQUALEAD® PO 8005. The composition advantageously has a polyphosphate content between 5 g/m$^3$ and 100 g/m$^3$, preferably between 5 g/m$^3$ and 50 g/m$^3$, typically of 20 g/m$^3$.

According to one particular embodiment, the aqueous composition is constituted of water, in particular water for industrial use, and of acid of formula (I) as defined above and below, and optionally of an additive from among a scale inhibitor, a corrosion inhibitor, a biocide and mixtures thereof, said aqueous composition having a pH between 6.5 and 8.5.

Preferably, the pH of the aqueous composition is between 6.5 inclusive and 8.5 exclusive. Advantageously, the pH of the aqueous composition is between 7.0 and 8.0, preferentially between 7.5 and 8.0, most preferably between 7.8 and 8.0.

The aqueous composition is also characterized by its total hardness and its total alkalinity.

The "total hardness" (TH) or "water hardness", is a parameter well known to a person skilled in the art. It corresponds to the concentration of calcium and magnesium ions and is often expressed in French degrees (symbol ° f. or ° f.H). The methods for measuring the TH are well known to a person skilled in the art. Generally, a distinction is made between the permanent hardness and the temporary hardness, the sum of the two being the total hardness. The hardness is determined by a complexometric titration with EDTA.

The "total alkalinity" (TA) is the value used to measure the content of hydroxides, carbonates and bicarbonates of a water. The unit of the TA is the French degree (° F. or ° fH).

The methods for measuring the TA are well known to a person skilled in the art. For example, it is possible to titrate the water to be analyzed with an acid in the presence of two colored indicators, one at 8.2 (phenolphthalein or Thymol blue) and the other at 4.4 (helianthin). Such a titration makes it possible to assay all of the hydroxide, carbonate and bicarbonate ions initially present.

Advantageously, in the process of the invention, the composition has a TH between 8° F. and 30° f, and a TA greater than or equal to 8° f.

The composition is also characterized by its conductivity, which is preferably less than or equal to 2400 µS/cm, more preferably less than or equal to 2000 µS/cm.

The amount of acid to be added depends on the amount of TA (total alkalinity) to be neutralized knowing that the makeup waters of the cooling towers have variable qualities. In the example of a sulfonic acid, in particular methanesulfonic acid, the pH range required for a TA of 10° F. is obtained with a practical titration of the acid generally lying between 160 mg/L and 1200 mg/L of the total volume of the circuit.

According to one particularly advantageous embodiment, the composition has a TH between 8° F. and 30° F., and a TA greater than or equal to 8° F. and a conductivity less than or equal to 2400 µS/cm. Preferably, these parameters are measured continuously and adjusted in order to be maintained in the target value ranges according to methods well known to a person skilled in the art.

When the galvanized steel surface is a cooling tower, or a part of such a tower, then step a) may be carried out according to several embodiments. According to the first embodiment, step a) comprises:
 a1) bringing said surface into contact with water, and
 a2) adding at least one organic acid of formula (I) as defined above or below, so that the water has a pH between 6.5 and 8.5.

According to this first embodiment, said steel surface at least partially coated with zinc is firstly brought into contact with water, the pH of which is not controlled, then the pH of the water is adjusted by addition of an acid of formula (I) so as to be between 6.5 and 8.5.

Alternatively, said steel surface at least partially coated with zinc is brought directly into contact with the aqueous composition having a pH between 6.5 and 8.5. The pH of the aqueous composition in contact with the steel surface is is thus controlled from the start.

Advantageously, the process according to the invention further comprises the following successive steps:
 b) measuring the pH of said composition brought into contact with the surface, and
 c) depending on the result of the measurement obtained in step b), adjusting the pH of said composition brought into contact with the surface to a value between 6.5 and 8.5, in particular by addition of acid of formula (I) as defined above or below.

Owing to the $CO_2$ stripping phenomenon, the pH naturally has a tendency to increase. Thus, the pH adjustment is generally carried out by addition of acid of formula (I) as defined above or below. Thus, barring an operational accident, two cases are generally encountered:
 either the pH measured in step b) is equal to the target value or else is within the target range, then the adjustment step c) is not necessary;
 or the pH measured in step b) is greater than the target value or the upper threshold of the target pH range; in this case the sufficient amount of acid of formula (I) to obtain the target pH value or to return to the targeted pH range (i.e. between 6.5 and 8.5) is added.

According to one particular embodiment, the amount of acid of formula (I) added for the adjustment of step c) is served to the measurement of step b) via an automaton.

According to one particular embodiment, the succession of steps b) and c) is repeated at predetermined time intervals until complete passivation of the zinc layer. In particular, steps b) and c) may be repeated at regular time intervals, for example every week, or every 3 days, or every day, until complete passivation of the zinc layer (in particular for 5 to 8 weeks).

According to one preferred embodiment, steps b) and c) are carried out continuously.

Preferably, the pH of the aqueous composition is adjusted during step c) to a value between 6.5 inclusive and 8.5 exclusive. Advantageously, the pH of the aqueous composition is adjusted during step c) to a value within the range 7.0-8.0, preferentially the range 7.5-8.0, most preferably the range 7.8-8.0.

The process comprising the successive steps a), b) and c) is preferably carried out so as to maintain the pH of the aqueous composition at a value within the targeted pH range (i.e. between 6.5 and 8.5) until complete passivation of the zinc layer. In general, the process of the invention is carried out for a duration of around 2 months, in particular between 3 weeks and 2 months, for example between 4 and 6 weeks.

The raw galvanized steel has a shiny appearance. The passivated galvanized steel is dull, due to the passivation layer. The formation of the passivation layer is monitored by:
 regular observations of the surface of the galvanized steel bundles (photos before, during and at the end of the chemical passivation),
 installing galvanized steel corrosion coupons (on a rack, immersed in the basin or on the surface of the tubes),
 permascope measurement of the thickness of zinc on the tube bundles.

The passivation is considered to be finished when the appearance of the galvanized steel has become dull and gray over the entire exposed surface.

One the complete passivation of the zinc layer is obtained, the implementation of the process can be stopped. The passivated galvanized steel layer can then be brought into contact directly with a composition free of acid of formula (I), advantageously corresponding to the specifications of the tower constructor, in particular in terms of TH, TA, pH and conductivity.

The invention also relates to the use of an organic acid of formula (I) as defined above (both in its general definition and in its preferred, advantageous or particular embodiments), for stopping the appearance of white rust on a steel surface at least partially coated with zinc brought into contact with water in order to obtain a solution having a pH at a desired value lying between 6.5 and 8.5. The use of such an organic acid of formula (I) with water enables the formation of the passivation layer on the surface and therefore stops the formation of the white rust. Preferably, the organic acid of formula (I) is methanesulfonic acid.

The invention also relates to an aqueous composition comprising an organic acid of formula (I) as defined above (both in its general definition and in its preferred, advantageous or particular embodiments), the composition having a pH lying between 6.5 and 8.5 (in particular between 6.5 inclusive and 8.5 exclusive), preferentially between 7 and 8, preferentially between 7.5 and 8, preferentially between 7.8 and 8. The composition of the invention is useful for preventing and/or stopping the appearance of white rust on a steel surface at least partially coated with zinc.

Preferably, the organic acid of formula (I) is methanesulfonic acid.

According to an advantageous embodiment, the aqueous composition of the invention further comprises a scale inhibitor and/or a corrosion inhibitor and/or a biocide, which may be as described above.

Advantageously, the aqueous composition is free of strong mineral acid, such as sulfuric acid or nitric acid or hydrochloric acid. Thus, preferably, the composition of the invention is free in particular of sulfuric acid, nitric acid and hydrochloric acid.

According to one particular embodiment, the aqueous composition of the invention is free of chromates.

According to one particular embodiment, the aqueous composition of the invention is free of tannins.

According to one particular embodiment, the aqueous composition is free of surfactant, in particular the aqueous composition is free of amphoteric surfactant.

According to one particular embodiment, the aqueous composition is constituted of water, in particular water for industrial use, of acid of formula (I) as defined above and below, and optionally of an additive from among a scale inhibitor (for example a polymer, a phosphonate), a corrosion inhibitor, a biocide (such as an oxidizing biocide agent, in particular chosen from sodium hypochlorite, and chlorine dioxide, or a non-oxidizing biocide agent such as isothiazolinones), and mixtures thereof, said aqueous composition having a pH between 6.5 and 8.5.

In particular, the aqueous composition comprises at least 95% by weight of water, in particular at least 99% by weight of water relative to the total weight of the composition.

The water may in particular be water for industrial use. It may be industrial water, municipal water (optionally softened and/or pretreated), drilling water and/or surface water (in particular lake water, rain water).

Advantageously, in the process of the invention, the composition has a TH between 8° F. and 30° F., and a TA greater than or equal to 8° F.

The composition is also characterized by its conductivity, which is preferably less than or equal to 2400 µS/cm, more preferably less than or equal to 2000 µS/cm.

According to one advantageous embodiment, the composition further comprises a phosphorus compound. Preferably, said phosphorus compound is a phosphating agent. For example, it may be a hexametaphosphate, in particular sold by SUEZ under the name AQUALEAD® PO 8005. The composition advantageously has a polyphosphate content between 5 g/m$^3$ and 100 g/m$^3$, preferably between 5 g/m$^3$ and 50 g/m$^3$, typically of 20 g/m$^3$.

The invention also relates to a cooling tower comprising a steel surface at least partially coated with zinc (therefore subject to the appearance of white rust in the presence of water), the surface being treated by the abovementioned process. The technical effect which results therefrom is the formation of the passivation layer in a time that is reduced to a few weeks. The advantage that ensues therefrom is that of preventing the formation of white rust while enabling a rapid startup of the tower under thermal load.

Advantageously, the process of the invention makes it possible to obtain the formation of the passivation layer starting from the commissioning of the cooling tower, under thermal load.

BRIEF DESCRIPTION OF THE DRAWINGS

The invention will be better understood and other advantages will be become apparent on reading the detailed description of an embodiment given by way of example, which description is illustrated by the appending drawing, wherein.

For the sake of clarity, the same components bear the same references in the various figures.

DETAILED DESCRIPTION

Figure 1:
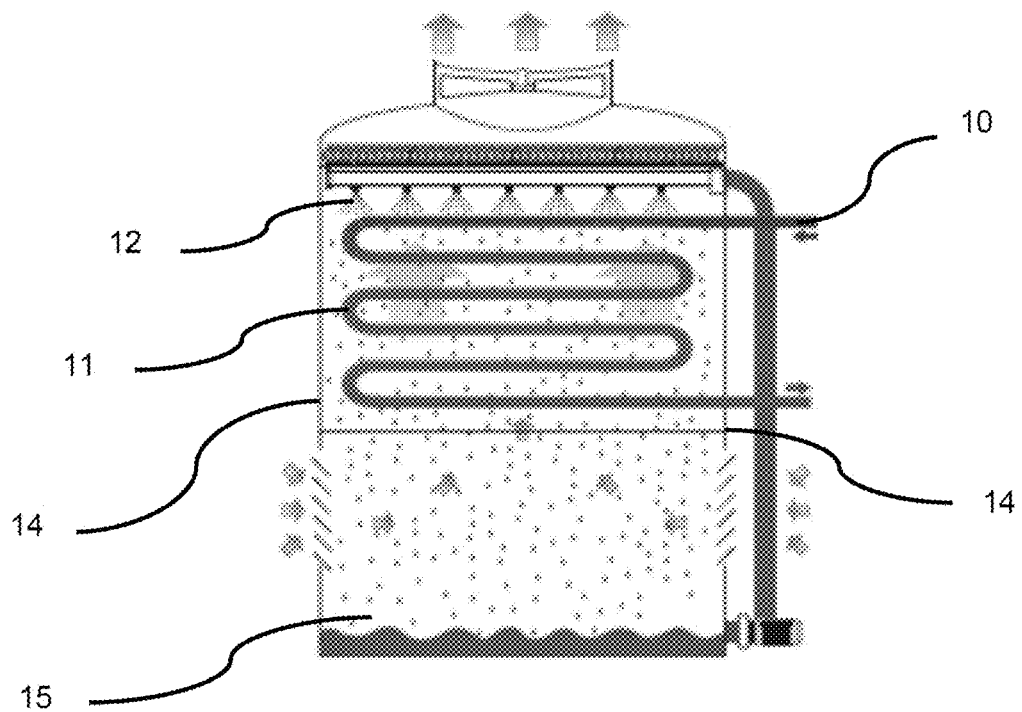
FIG. 1 schematically represents a closed-type cooling tower according to the prior art, FIG. 2 schematically represents an open-type cooling tower according to the prior art, FIG. 3 schematically represents a cooling tower treated by the process according to the invention.
Figure 2:
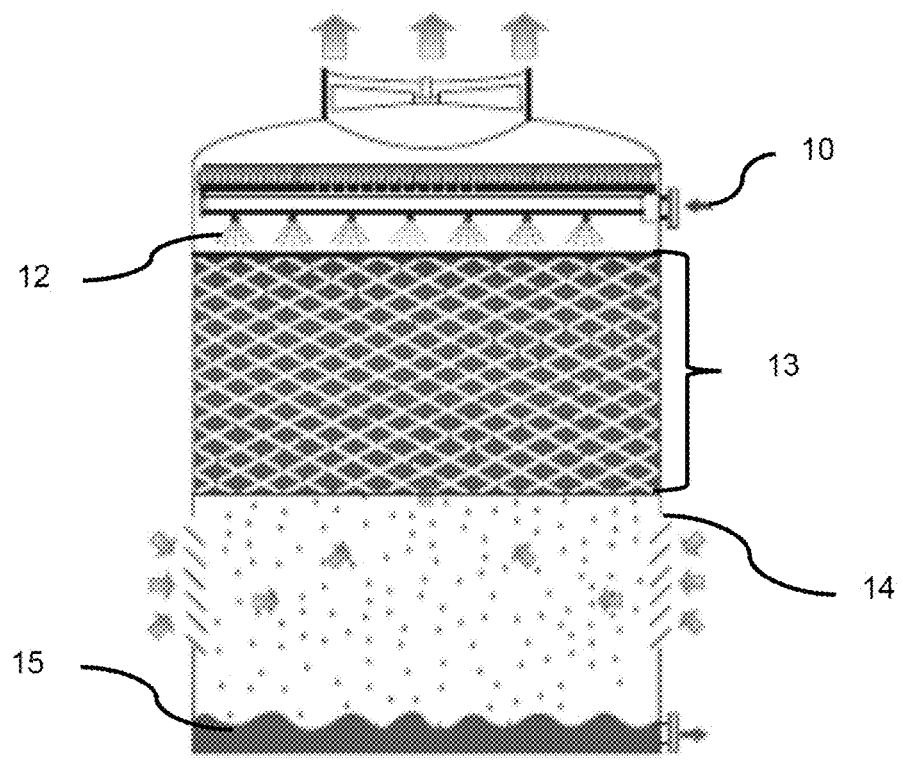

FIG. 1 schematically represents a closed-type cooling tower according to the prior art, FIG. 2 schematically represents an open-type cooling tower according to the prior art and both were presented in the introduction.

In one advantageous embodiment, the process according to the invention comprises a step of bringing said surface into contact with an aqueous composition, the pH of which is between 6.5 and 8.5 comprising methanesulfonic acid.

In this embodiment, the process comprises a step b) of measuring the pH of said composition in contact with the surface, and a step c) of adjusting the pH of said composition in contact with the surface to the desired value or to a value within the target pH range (at least between 6.5 and 8.5) as a function of the result of the measurement obtained in step b), in particular by addition of methanesulfonic acid, the pH having a tendency to increase naturally owing to the CO$_2$ stripping phenomenon. These steps are preferably carried out continuously. The measurement and adjustment steps allow good control of the pH so that the composition has a pH equal to or substantially equal to the desired value(s), or lying within a target range. Owing to these steps, the conditions required in terms of pH for the formation of the passivation layer are ensured. A pH control device also makes it possible to avoid any overconsumption of acid.

Owing to the relatively low pKa of the methanesulfonic acid (pKa=−1.9), the pH may by regulated by moderate additions of this acid, without supplementary supply of salts of harmful strong acids.

The risk of the pH decreasing too greatly after addition of acid is prevented by the fact that the acid is added gradually in water-diluted form, the adjustment being controlled by a regulator.

Once the passivation layer has formed, the zinc is protected. The adjustment of organic acid of formula (I) as defined above is no longer necessary. A preventative anti-corrosion treatment, not comprising the addition of acid of formula (I), is then preferably applied, in accordance in particular with the specifications of the cooling tower manufacturers.

In this embodiment, preferably the composition further comprises hexametaphosphate, in particular sold by SUEZ under the name AQUALEAD®8005. The composition advantageously has a polyphosphate content between 5 g/m$^3$ and 100 g/m$^3$, preferably between 5 g/m$^3$ and 50 g/m$^3$, typically of 20 g/m$^3$. The composition may also comprise an anti-scaling additive and/or a biocide.

In this embodiment, the composition has a TH between 8° F. and 30° F., and a TA greater than or equal to 8° F. and a conductivity of less than or equal to 2400 or 2000 µS/cm. Preferably, these parameters are measured continuously and adjusted in order to be maintained within the target value ranges.

Figure 3:
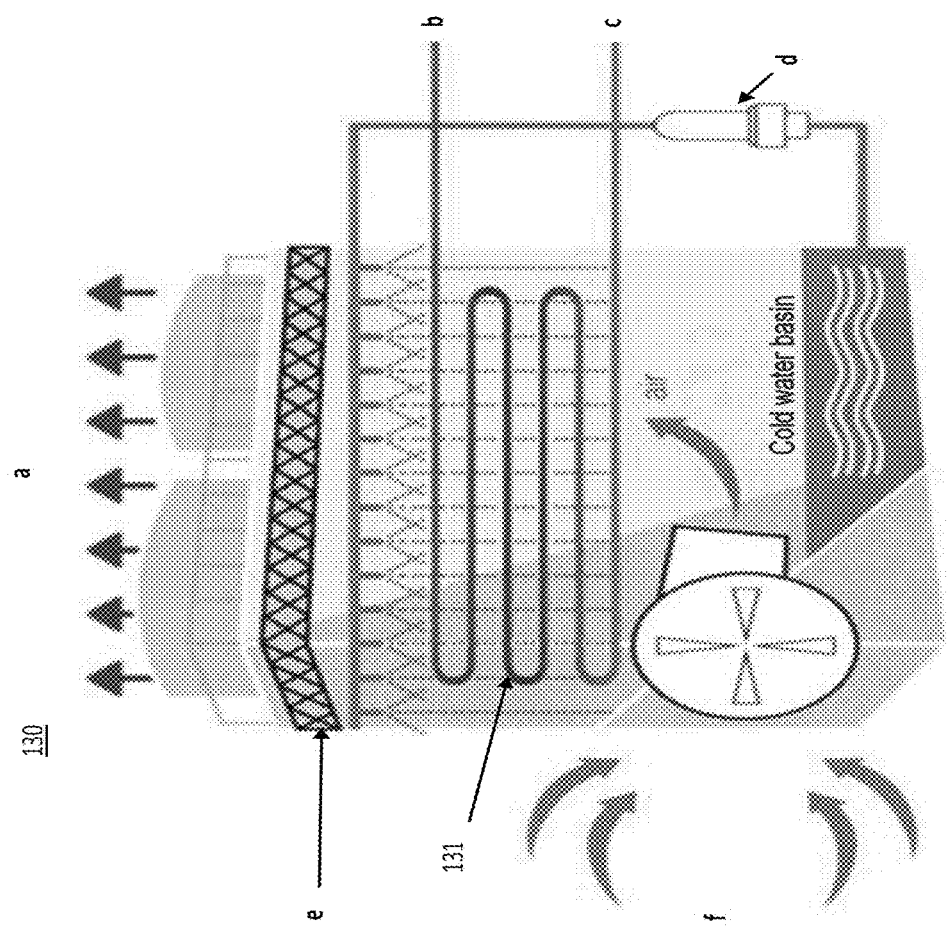

FIG. 3 schematically represents a cooling tower 130 treated by the process according to the invention. The cooling tower 130 comprises at least one steel surface 131 coated, at least partially, with zinc. Represented are the air intake (f), the air outlet (a), the hot fluid inlet (b) and the cooled fluid outlet (c), and also the recirculation pump (d) and the splash guard (e).

Treated by the process according to the invention as described above, the surface 131 has a protective layer referred to as a passivation layer.

EXAMPLES

Tests were carried out on a pilot cooling tower over a minimum operating period of four weeks. The test conditions are summarized in the table below:

| | |
|---|---|
| Makeup water quality | Municipal water (TH 28, TA 20, pH 7.8) |
| Tower power | 28 kW |
| Circuit volume | 160 liters |
| Flow rate | 900 liters/hour |
| Exchanger skin temperature | 70° C. (regulated) |
| Tower outlet temperature | 25° C. (regulated) |
| Concentration factor | Between 1.1 and 1.3 |
| Analyses | Monitoring of the following parameters (makeup and circuit) Parameter: TH, TA, Cl (chlorides in mg/L), pH, $SO_4^{2-}$ (sulfates in mg/L), $SiO_2$ (silica in mg/L), phosphates (in mg/L), Zn (zinc in mg/L) |
| Treatment | Isothiazolinone-type biocide treatment with (examples 1, 2 and 3) or without (example 4) anti-scaling and anticorrosion treatment |
| Acid control (Circuit pH setpoint) | Example 1 = 7.5 Example 2 = 7.8 Example 3 = 8.0 |
| Monitoring of the corrosion | LPR (low (or linear) polarization resistance) method on a mild steel probe. Visual observation of the galvanized steel tubes and plates in the packing and the basin of the cooling tower (CT). Metallographic analysis of the control tubes |

The TH is maintained at a value between 8° F. and 30° F., the TA is maintained at a value greater than or equal to 8° F. and the conductivity is maintained at a value less than or equal to 2400 µS/cm. The tests were carried out with various acids.

Comparative Example 1

Firstly, tests were carried out with citric acid. The quality of the film formed under these conditions is mediocre: an onset of generalized corrosion of the zinc layer (galvanized layer) took place but (early stage) with a loss of thickness of the galvanized layer of around 30 µm. The underlying steel tube is intact and does not exhibit any significant damage, but the passivation layer thus obtained does not make it possible to prevent corrosion. Moreover, the bacterial count is off target. Citric acid does not therefore make it possible to solve the problem of the invention.

Comparative Example 2

Another test was carried out with nitric acid $HNO_3$. At the end of the test period, the thickness of the zinc layer (galvanized layer) was partially consumed and an onset of corrosion of the steel of the test tube was observed. This confirms that a strong inorganic (mineral) acid such as nitric acid does not make it possible to form the protective passivation layer, but on the contrary leads to the corrosion of the galvanized steel.

Examples according to the invention: Several tests were carried out with methanesulfonic acid (of formula RXOH where X is $SO_2$ and R is $CH_3$) and a target pH value of 7.5 (example 1) and of 7.8 (example 2). These tests showed the partial formation of the stable passivation layer after two weeks of testing, combined with a loss of thickness of the galvanized layer of around 30 µm. Unlike comparative example 1, the loss of thickness of the zinc layer is stabilized at this stage, owing to the good quality of the passivation layer formed. The underlying steel tube does not exhibit any significant damage. The bacterial proliferation remains controlled. The passivation layer appears uniform after two months of testing. The analyses carried out on the film by infrared (IR) spectroscopic analysis reveal the presence of stable zinc oxide forms.

A complementary test carried out with a target pH value of 8.0 (example 3) gives similar results. Such a target pH value further makes it possible to moderate the consumption of methanesulfonic acid during the implementation of the process.

Another test was carried out in the absence of phosphorus additive (example 4). It is then observed that the passivation layer forms more slowly than in examples 1, 2 and 3.

Supplementary Example 1

Carrying out a Chemical Passivation Under Load Over 4 Weeks During the Startup of a Baltimore Cooling Tower The Baltimore cooling tower passivated in this test is an evaporative condenser (fluid used in the primary circuit=$NH_3$), model VXC-221 R series no. H180200201 (Dieue sur Meuse), of which the exchange body (tube bundles) is made of galvanized steel. Purging is carried out if a predetermined conductivity threshold (measured using a conductivity probe) is exceeded.

During this test, the makeup water used is a "re-hardened" water so as to achieve a value greater than 8° F. in the circuit. Moreover, the pH is adjusted so that the alkalinity TA is greater than 8° F. in the circuit.

During the "passivation" period, which extends over a period of 4 to 8 weeks after startup of the tower, the following additives are added to the makeup water:
Phosphating agent: Aqualead PO 8005, at a dose of 70 to 100 g/m³ in the circuit. This product is injected by a specific pump, independent of the device for adding methanesulfonic acid.
Methanesulfonic acid: Aqualead PA 065/DPIA16-0003, over a period of 4 weeks so as to maintain a regulated pH of 7.8 to 8.2 in the circuit, the target pH being 7.8.
During the passivation period, the parameters of the water used in the circuit are the following:

| Characteristics | PASSIVATION |
|---|---|
| Duration | 4 weeks |
| Characteristics of the makeup water (mixed water - on average over the period) | TH: 6.2° f., TA: 20.1° f., Cl⁻: 18.5 mg/L, C: 560 µS/cm, pH = 7.4 |
| Characteristics of the circuit water (on average over the period) | TH: 18° f., TA: 13.3° f., Cl⁻: 64 mg/L, C: 1529 µS/cm, pH = 8.1 |

| Characteristics | PASSIVATION |
| --- | --- |
| pH control | pH: 7.9 by injection of methanesulfonic acid |
| Average DPIA16-0003 dosage | 593 g/m³ |
| Average PO 8005 (makeup) dosage | 25 g/m³ |
| Biocide | BC 08 |
| Water consumption | 489 m³ |

The analytical monitoring is carried out each week in order to ensure that the physicochemical and microbiological parameters are satisfactory. The average pH during the period is pH=8.1 (between 7.8 and 8.3) and is remotely monitored. In the case of starting up a tower of this model under load, a natural increase in the pH up to 8.3 in the circuit is usually observed. It is therefore necessary to inject a passivating and acidic product in order to be within the optimum interval of 7.5<pH<8 for the passivation of the galvanized steel. Via control, the target pH is 7.8. The appearance and the thickness of the galvanized steel tube bundles are observed regularly during the chemical passivation. The shiny tubes at the start (D0) gradually become gray and dull (D0+4 weeks) (visual observation). Moreover, it is observed that the average thickness over 3 points measured by permascope does not decrease: at D0, this thickness is 65 µm, and changes to 68 µm at D0+4 weeks.

Conclusion: The passivation was validated visually and corroborated by the absence of appearance of white rust. The device for adding phosphating agent and methanesulfonic acid was removed, and the tower now operates routinely according to the supplier's recommendations.

Supplementary Example 2

Carrying out a Chemical Passivation Under Load Over 4 Weeks During the Startup of a Baltimore Cooling Tower The Baltimore cooling tower passivated in this test is an evaporative condenser (fluid used in the primary circuit=$NH_3$+glycol water), model CXVE-340 1012 201 series no. H17 07 71701 (Honfleur), of which the exchange body (tube bundles) is made of galvanized steel. Purging is carried out if a predetermined conductivity threshold (measured using a conductivity probe) is exceeded.

During this test, the makeup water used is a "re-hardened" water so as to achieve a value greater than 8° F. in the circuit. Moreover, the pH is adjusted so that the alkalinity TA is greater than 8° F. in the circuit.

During the "passivation" period, which extends over a period of 4 to 8 weeks after startup of the tower, the following additives are added to the makeup water:

Phosphating agent: Aqualead PO 8005, at a dose of 70 to 100 g/m³ in the circuit. This product is injected by a specific pump, independent of the device for adding methanesulfonic acid.

Methanesulfonic acid: Aqualead PA 065/DPIA16-0003, over a period of 4 weeks so as to maintain a regulated pH of 7.8 to 8.2 in the circuit, the target pH being 7.8.

During the passivation period, the parameters of the water used in the circuit are the following:

| Characteristics | PASSIVATION |
| --- | --- |
| Start date/Stop date | From 16 Feb. 2018 to 12 Apr. 2018 |
| Characteristics of the makeup water (mixed water - on average over the period) | TH: 5.4° f., TA: 22.4° f., Cl⁻: 37 mg/L, C: 568 µS/cm, pH = 7.8 |
| Characteristics of the circuit water (on average over the period) | TH: 10.3° f., TA: 7.5° f., Cl⁻: 81 mg/L, C: 1192 µS/cm, pH = 7.8, ox = 0.68 mg/LCl₂/L |
| pH control | pH: 7.9 by injection of organic acid |
| Average DPIA16-0003 dosage | 400 g/m³ |
| Average PO 8005 dosage | 71.6 g/m³ |
| Average PO 8005 (makeup) dosage | 50 g/m³ for a target Rc at 2 |
| Biocide | BC 16C |
| Water consumption | 101 m³ |
| Fluids | $NH_3$, GLYCOL WATER |

The analytical monitoring is carried out each week in order to ensure that the physicochemical and microbiological parameters are satisfactory. The average pH during the period is pH=8.1 (between 7.8 and 8.3) and is remotely monitored. In the case of starting up a tower of this model under load, a natural increase in the pH up to 8.3 in the circuit is usually observed. It is therefore necessary to inject a passivating and acidic product in order to be within the optimum interval of 7.5<pH<8 for the passivation of the galvanized steel. Via control, the target pH is 7.8. The appearance of the galvanized steel tube bundles are observed regularly during the chemical passivation. The shiny tubes at the start (D0) gradually become gray and dull (D0+4 weeks) (visual observation).

Conclusion: The passivation was validated visually and corroborated by the absence of appearance of white rust. The device for adding phosphating agent and methanesulfonic acid was removed, and the tower now operates routinely according to the supplier's recommendations.

The device for regulating the addition of methanesulfonic acid as a function of the pH used in the two supplementary examples 1 and 2 above comprises a pH measurement probe, a metering pump, a metering tank and the containment thereof. The water from the circuit is diverted to an inlet point of the regulating device. The water from the circuit is drawn off at a draw-off point connected to a flow detector. A pH probe measures the pH of the circuit water drawn off. A second pH probe, referred to as a safety probe may also be present. Depending on the result of the pH measurement, the pH is adjusted, if need be, within a range of predetermined values as explained above, by addition of an acid of formula (I), methanesulfonic acid in the two supplementary examples 1 and 2, at an injection point. The metering pump is connected to the injection point on the one hand, and to the metering tank and the containment thereof on the other hand. A dedicated apparatus is connected between the pH probe and the metering pump to manage the amount of acid to be injected as a function of the pH measurement. Lastly, the device comprises an outlet point downstream of the injection point and the water is sent back to the circuit.

The invention claimed is:

1. A process for preventing the formation of white rust on a steel surface at least partially coated with zinc, comprising
a) bringing said surface at least partially coated with zinc into contact with an aqueous composition, the pH of which is between 6.5 and 8.5 and comprising at least one organic acid of formula (I):

R—X—OH (I)

wherein X represents S(O)₂, and R represents:
- a linear or branched $C_1$-$C_{12}$ alkyl, optionally substituted with one or more groups chosen from a halogen, OH, COOH or an aryl or heteroaryl group, said aryl or heteroaryl group being itself optionally substituted with a halogen, OH, a linear or branched $C_1$-$C_4$ alkyl or a COOH group; or
- an aryl or heteroaryl group, optionally substituted with a halogen, OH, linear or branched $C_1$-$C_4$ alkyl or COOH group;

b) measuring the pH of said composition brought into contact with the surface at least partially coated with zinc, and c) depending on the result of the measurement obtained in step b), adjusting the pH of said composition in contact with the surface at least partially coated with zinc to a value between 6.5 and 8.5 by addition of a further amount of said at least one acid of formula (I).

2. The process as claimed in claim 1, wherein the pH of the aqueous composition is between 7.0 and 8.0.

3. The process as claimed in claim 1, wherein the composition has a total hardness (TH) between 8° F. and 30° F., and a total alkalinity (TA) of greater than or equal to 8° F., and a conductivity of less than 2000 µS/cm.

4. The process as claimed in claim 1, wherein the steel surface at least partially coated with zinc is subjected to a temperature rise.

5. The process as claimed in claim 1, wherein R is $CH_3$.

6. The process as claimed in claim 1, wherein the aqueous composition further comprises a phosphorus compound.

7. The process as claimed in claim 1, wherein the pH of the aqueous composition is between 7.5 and 8.0.

8. The process as claimed in claim 1, wherein the pH of the aqueous composition is between 7.8 and 8.0.

9. The process as claimed in claim 1, wherein the aqueous composition further comprises a phosphating agent.

10. The process as claimed in claim 1, wherein the aqueous composition further comprises hexametaphosphate.

11. The process as claimed in claim 1, wherein the aqueous composition comprises at least 95% by weight of water, relative to the total weight of the composition.

12. The process as claimed in claim 1, wherein the aqueous composition comprises at least 99% by weight of water, relative to the total weight of the composition.

13. A process for preventing the formation of white rust on a steel surface at least partially coated with zinc, comprising a) bringing said surface at least partially coated with zinc into contact with an aqueous composition, the pH of which is between 6.5 and 8.5 and comprising at least one organic acid of formula (I):

R—X—OH (I)

wherein X represents S(O)₂, and R represents:
- a linear or branched $C_1$-$C_{12}$ alkyl, optionally substituted with one or more groups chosen from a halogen, OH, COOH or an aryl or heteroaryl group, said aryl or heteroaryl group being itself optionally substituted with a halogen, OH, a linear or branched $C_1$-$C_4$ alkyl or a COOH group; or
- an aryl or heteroaryl group, optionally substituted with a halogen, OH, linear or branched $C_1$-$C_4$ alkyl or COOH group;

b) measuring the pH of said composition brought into contact with the surface at least partially coated with zinc, and c) depending on the result of the measurement obtained in step b), adjusting the pH of said composition in contact with the surface at least partially coated with zinc to a value between 6.5 and 8.5 by addition of a further amount of said at least one acid of formula (I), wherein the aqueous composition further comprises hexametaphosphate.

* * * * *